US012585799B2

(12) United States Patent　　(10) Patent No.:　US 12,585,799 B2
Hashimoto　　(45) Date of Patent:　Mar. 24, 2026

(54) INFORMATION MANAGEMENT METHOD, DISPLAY APPARATUS, AND NON-TRANSITORY COMPUTER-READABLE STORAGE MEDIUM STORING PROGRAM THAT DISCLOSES BOTH A FIRST PARAMATER AND A SECOND PARAMATER OBTAINED BY IRREVERSIBY CONVERTING THE FIRST PARAMATER

(71) Applicant: SEIKO EPSON CORPORATION, Tokyo (JP)

(72) Inventor: Hiroyuki Hashimoto, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 170 days.

(21) Appl. No.: 18/238,561

(22) Filed: Aug. 28, 2023

(65) Prior Publication Data

US 2024/0070296 A1　　Feb. 29, 2024

(30) Foreign Application Priority Data

Aug. 29, 2022　　(JP) ................................ 2022-135764

(51) Int. Cl.
*G06F 21/16*　　(2013.01)
*G06F 21/60*　　(2013.01)
*G06T 1/00*　　(2006.01)
*H04L 9/00*　　(2022.01)
*H04L 9/06*　　(2006.01)

(52) U.S. Cl.
CPC ............ *G06F 21/604* (2013.01); *G06F 21/16* (2013.01); *G06T 1/0028* (2013.01); *H04L 9/0643* (2013.01); *H04L 9/50* (2022.05)

(58) Field of Classification Search
CPC ......... G06F 21/604; G06F 21/16; H04L 9/50; H04L 9/0643; G06T 1/0028
USPC .......................................................... 726/27
See application file for complete search history.

(56) References Cited

U.S. PATENT DOCUMENTS

| | | | | |
|---|---|---|---|---|
| 8,718,446 | B1 * | 5/2014 | Daniel ................... | H04N 5/913 |
| | | | | 386/260 |
| 11,790,096 | B2 * | 10/2023 | Lyren ................. | G06Q 20/0658 |
| 2006/0062073 | A1 | 3/2006 | Kitani et al. | |
| 2007/0205596 | A1 | 9/2007 | Mizuno et al. | |
| 2014/0129841 | A1 * | 5/2014 | McMillan ............... | G06F 21/16 |
| | | | | 713/176 |

(Continued)

FOREIGN PATENT DOCUMENTS

| | | |
|---|---|---|
| JP | 2000-56681 A | 2/2000 |
| JP | 2002-114334 A | 4/2002 |

(Continued)

OTHER PUBLICATIONS

"NHK and Mitsubishi Electric Develop Digital Watermarking Technology Capable of Detecting Sneak-shot Video Contents of Movies", Publisher, Impress Watch Corporation, an Impress Group company, Dec. 5, 2007.

*Primary Examiner* — Thanh T Le
(74) *Attorney, Agent, or Firm* — Oliff PLC

(57) ABSTRACT

An information management method according to an aspect of the present disclosure includes disclosing, by a computer, a second parameter obtained by irreversibly converting a first parameter and disclosing, by the computer, the first parameter simultaneously with disclosing the second parameter or after disclosing the second parameter.

7 Claims, 5 Drawing Sheets

(56) References Cited

U.S. PATENT DOCUMENTS

| | | | | |
|---|---|---|---|---|
| 2014/0204225 | A1 | 7/2014 | Takimoto | |
| 2015/0356306 | A1* | 12/2015 | Carter | G06F 21/64 |
| | | | | 380/246 |
| 2016/0247423 | A1* | 8/2016 | Hohl | H04N 21/812 |
| 2021/0390161 | A1 | 12/2021 | Nakadaira et al. | |
| 2022/0046332 | A1* | 2/2022 | Singh | H04N 21/6581 |
| 2022/0150377 | A1* | 5/2022 | Kunori | H04L 9/3236 |
| 2022/0198447 | A1 | 6/2022 | Haruna | |
| 2022/0353082 | A1* | 11/2022 | Busch | H04L 9/3247 |
| 2023/0055618 | A1* | 2/2023 | Jakobsson | G06F 3/04817 |
| 2023/0085677 | A1* | 3/2023 | Copeland | G06Q 30/06 |
| | | | | 705/66 |
| 2023/0410072 | A1* | 12/2023 | Perna | G06Q 30/018 |
| 2024/0029191 | A1* | 1/2024 | Monahan | G06T 1/0028 |
| 2024/0127390 | A1* | 4/2024 | Osman | G06T 1/0085 |
| 2024/0223373 | A1* | 7/2024 | Kiilsgaard | G07D 7/202 |
| 2024/0281803 | A1* | 8/2024 | Ishii | G06F 21/64 |
| 2024/0305469 | A1* | 9/2024 | Lee | G06F 21/10 |
| 2024/0362738 | A1* | 10/2024 | Alattar | G10L 19/018 |
| 2024/0373087 | A1* | 11/2024 | Ge | H04N 21/4627 |

FOREIGN PATENT DOCUMENTS

| | | | |
|---|---|---|---|
| JP | 2004-288280 | A | 10/2004 |
| JP | 2005-191765 | A | 7/2005 |
| JP | 2005-284778 | A | 10/2005 |
| JP | 2006-236275 | A | 9/2006 |
| JP | 2007-174108 | A | 7/2007 |
| JP | 2014-139732 | A | 7/2014 |
| JP | 2018-26133 | A | 2/2018 |
| JP | 2020-68388 | A | 4/2020 |
| JP | 2020-201660 | A | 12/2020 |
| JP | 2021-089640 | A | 6/2021 |
| WO | 2014/199463 | A1 | 12/2014 |

* cited by examiner

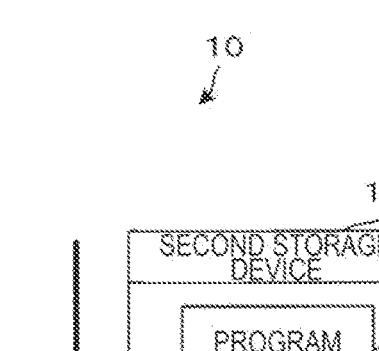

100 SECOND PROCESSING DEVICE

101 — INDIVIDUAL ID ACQUIRER

102 — UNFIXED INFORMATION GENERATOR

103 — IRREVERSIBLE CONVERTER

104 — ELECTRONIC WATERMARK GENERATOR

105 — ELECTRONIC WATERMARK DISCLOSER

106 — NFT GENERATOR

107 — NFT DISCLOSER

130 SECOND STORAGE DEVICE

PROGRAM — 131

150 INPUT DEVICE

160 SECOND COMMUNICATION DEVICE → (221) → (CD)

170 THIRD COMMUNICATION DEVICE → (400)

400   E1   221

NFT
· FIRST PARAMETER (INDIVIDUAL ID, UNFIXED INFORMATION) — D
· SECOND PARAMETER
· OWNER INFORMATION
  . . .

G   E2

INFORMATION MANAGEMENT METHOD, DISPLAY APPARATUS, AND NON-TRANSITORY COMPUTER-READABLE STORAGE MEDIUM STORING PROGRAM THAT DISCLOSES BOTH A FIRST PARAMATER AND A SECOND PARAMATER OBTAINED BY IRREVERSIBY CONVERTING THE FIRST PARAMATER

The present application is based on, and claims priority from JP Application Serial Number 2022-135764, filed Aug. 29, 2022, the disclosure of which is hereby incorporated by reference herein in its entirety.

BACKGROUND

1. Technical Field

The present disclosure relates to an information management method, a display apparatus, and a non-transitory computer-readable storage medium storing a program.

2. Related Art

There has been known a technology for guaranteeing that certain information has not been tampered.

For example, JP-A-2005-191765 (Patent Literature 1) discloses an image management system that includes an image reading apparatus and manages an image read by the image reading apparatus. The image management system includes a component that creates an electronic watermark based on identification information of the image reading apparatus and a cumulative number of times of reading by the image reading apparatus and a component that creates, based on image identification information on which the electronic watermark is based, a fingerprint corresponding to an image in which the electronic watermark is embedded. The image identification information is the identification information and the cumulative number of times of reading. The image management system includes a fingerprint management database that stores the image identification information on which the electronic watermark is based and the fingerprint in association with each other. This association is managed by the fingerprint management database to make it possible to verify that a certain image has been created by a specific image input apparatus and has not been tampered.

However, in Patent Literature 1, since the fingerprint management database that stores the image identification information on which the electronic watermark is based and the fingerprint in association with each other is required, cost for managing the association increases.

SUMMARY

According to an aspect of the present disclosure, there is provided an information management method including causing a computer to execute: disclosing a second parameter obtained by irreversibly converting a first parameter; and disclosing the first parameter simultaneously with disclosing the second parameter or after disclosing the second parameter.

According to an aspect of the present disclosure, there is provided a display apparatus including: an optical device configured to radiate image light corresponding to display target image; and a controller configured to control the optical device, wherein the controller executes: causing the optical device to display a second parameter obtained by irreversibly converting a first parameter; and disclosing the first parameter simultaneously with displaying the second parameter or after displaying the second parameter.

According to an aspect of the present disclosure, there is provided a non-transitory computer-readable storage medium storing a program, the program causing a computer to execute: disclosing a second parameter obtained by irreversibly converting a first parameter; and disclosing the first parameter simultaneously with disclosing the second parameter or after disclosing the second parameter.

BRIEF DESCRIPTION OF THE DRAWINGS

FIG. 3 is a diagram showing an electric configuration of the information processing apparatus.

DESCRIPTION OF EMBODIMENTS

Figure 1:
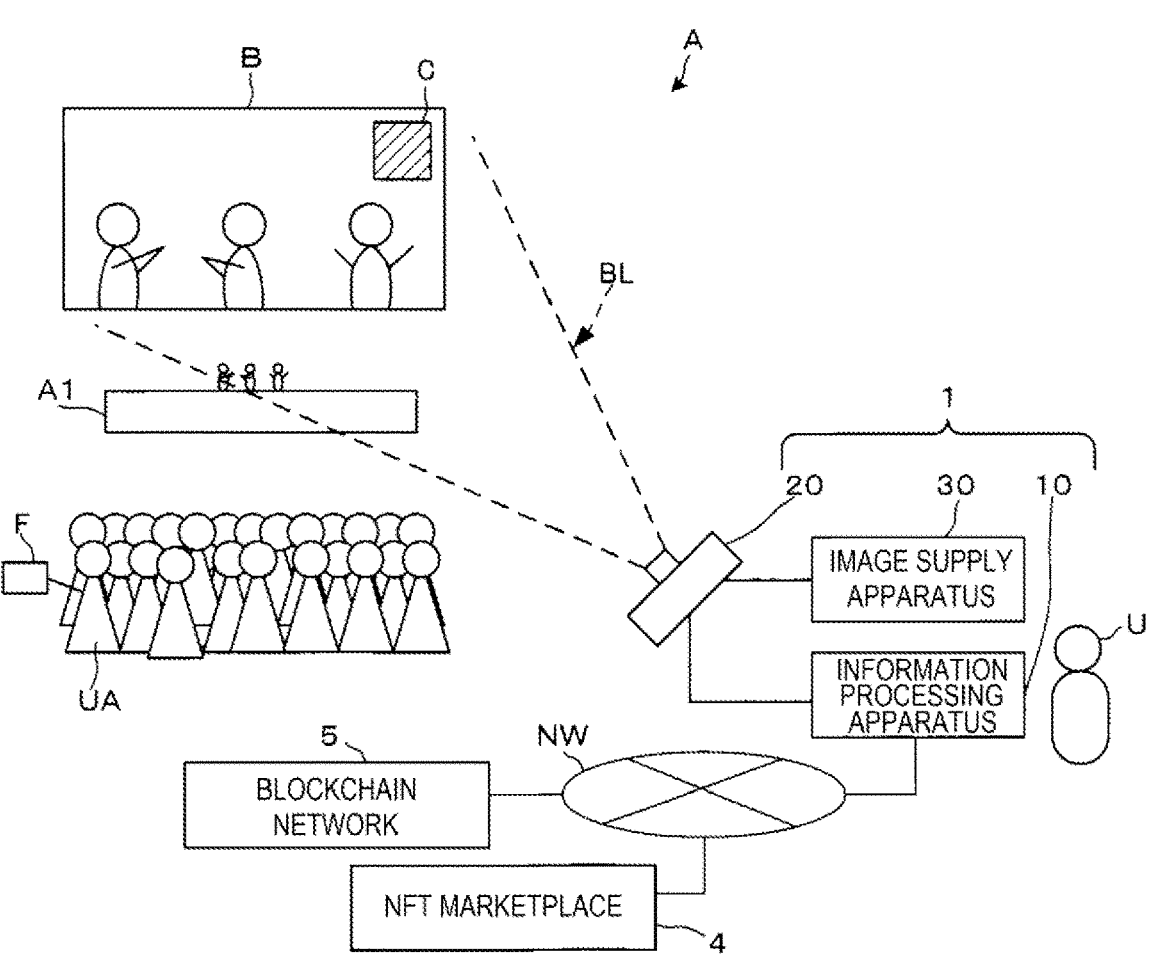
FIG. 1 is a schematic diagram showing an example of a display system including an information processing apparatus according to a first embodiment of the present disclosure.

Preferred modes according to the present disclosure are explained below with reference to the drawings. In the drawings, dimensions and scales of units are sometimes different from actual ones. The drawings sometimes include portions schematically shown in order to facilitate understanding. In the following explanation, the scope of the present disclosure is not limited to the modes described in the following explanation unless it is specifically described that the present disclosure is limited. The scope of the present disclosure includes a scope of equivalents of the modes.

1. First Embodiment

Configuration of a Display System

FIG. 1 is a schematic diagram showing an example of a display system 1 including an information processing apparatus 10 according to a first embodiment.

The display system 1 is a system that displays an image B in a position visible from one or a plurality of participants UA in a venue A. The venue A is a place where an activity in which the participants UA gather is performed and may be any indoor or outdoor place. The participants UA are specified or unspecified people. The activity in which the participants UA gather is, for example, an event, a meeting, a lecture, and a lesson. The event is, for example, a concert, a screening party, a lecture meeting, and an exhibition for sale. The image B includes information transmitted to the participants UA present in the venue A. The information included in the image B is, for example, a captured image of a performance performed on a stage A1 provided in the venue A, materials of the meeting, the lesson, and the like or an advertisement concerning the event.

The display system 1 in this embodiment includes, as shown in FIG. 1, the information processing apparatus 10, a projector 20, and an image supply apparatus 30. The information processing apparatus 10 and the projector 20 are communicably connected to each other. The image supply apparatus 30 is an apparatus that supplies image data BD of the image B to the projector 20. The image supply apparatus 30 is connected to the projector 20 to be capable of inputting an image signal of the image data BD to the projector 20. A transmission path for the image signal between the image supply apparatus 30 and the projector 20 may be either wired or wireless.

Figure 2:
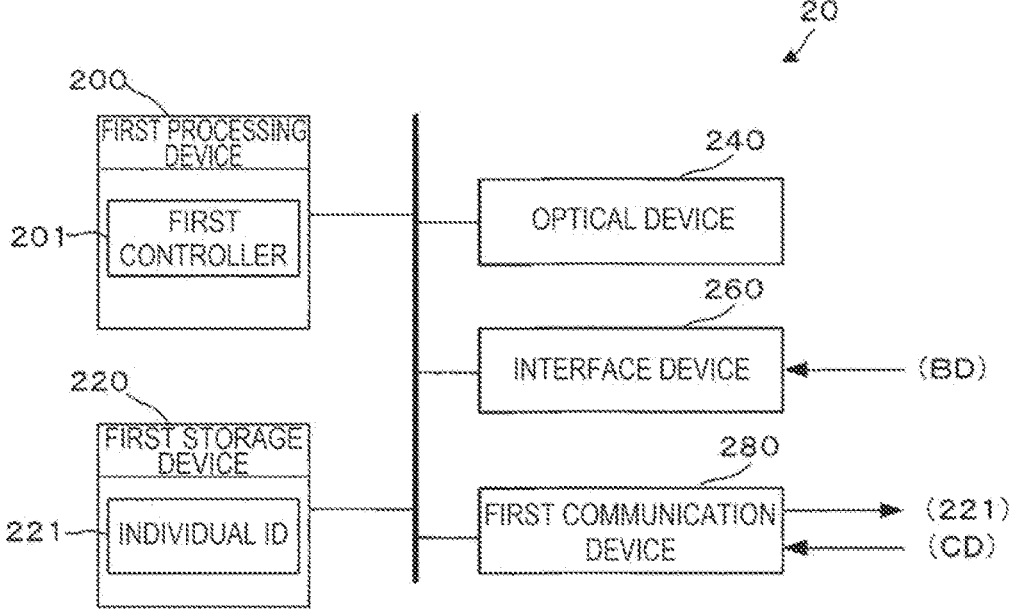
FIG. 2 is a diagram showing an electric configuration of a projector.

FIG. 2 is a diagram showing an example of an electric configuration of the projector 20.

The projector 20 is an example of a display apparatus that displays the image B based on the image data BD. As shown in FIG. 2, the projector 20 includes a first processing device 200, a first storage device 220, an optical device 240, an interface device 260, and a first communication device 280, which are connected to a bus. The first processing device 200 includes a processor such as a CPU (Central Processing Unit). The first storage device 220 is a recording medium readable by the first processing device 200. The first storage device 220 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Radom Access Memory).

The first processing device 200 in this embodiment functions as a first controller 201 that controls the units of the projector 20. The first processing device 200 may function as other functional units. The first storage device 220 stores an individual ID 221. The individual ID 221 is identification information uniquely given to each of a plurality of projectors 20.

The optical device 240 is a device that emits image light BL (FIG. 1) based on a display target image B. The image B is displayed by the emission of the image light BL. The optical device 240 in this embodiment includes a light source such as a light valve, a display panel functioning as a light modulation device, and an optical system including a projection lens. The display panel modulates light of the light source based on the image data BD to output the image light BL. The image light BL is emitted from the optical system to be projected onto a projection surface. As a result, the image B corresponding to the image light BL is displayed on the projection surface.

The interface device 260 is a device to which the image data BD is input from the image supply apparatus 30. The interface device 260 includes hardware conforming to a predetermined standard concerning input of an image signal. The hardware includes, for example, a connector and an interface circuit.

The first communication device 280 is a device that communicates with the information processing apparatus 10. A communication scheme may be either a wireless scheme or a wired scheme. When the communication scheme is the wireless scheme, the first communication device 280 includes a wireless communication module including, for example, an antenna, an RF (Radio Frequency) circuit, and a baseband circuit. When the communication scheme is the wired scheme, the first communication device 280 includes a wired communication module including a connector to which a communication cable is connected and an interface circuit that processes signals transmitted and received via the connector.

The individual ID 221 is given from the projector 20 to the information processing apparatus 10 and electronic watermark data CD explained below is given from the information processing apparatus 10 to the projector 20 by the first communication device 280.

The electronic watermark data CD is data of an electronic watermark C (FIG. 1) displayed in the image B. The electronic watermark data CD is input to the first processing device 200 from the first communication device 280. The image light BL obtained by superimposing light for projecting the electronic watermark C based on the electronic watermark data CD and light for projecting the image B based on the image data BD is emitted from the optical device 240 according to control by the first controller 201. When the image light BL is projected, the image B including the electronic watermark C is displayed. Information indicated by the electronic watermark C is explained below.

FIG. 3 is a diagram showing an example of an electric configuration of the information processing apparatus 10.

The information processing apparatus 10 is an apparatus operated by a user U. The user U in this embodiment is, for example, a sponsor who sponsors the activity in which the participants UA gather or a person related to the sponsor. The information processing apparatus 10 is an example of an apparatus having a function of a computer such as a desktop, laptop, or tablet personal computer or a smartphone.

As shown in FIG. 3, the information processing apparatus 10 in this embodiment includes a second processing device 100, a second storage device 130, an input device 150, a second communication device 160, and a third communication device 170, which are connected to the bus. The second processing device 100 includes a processor such as a CPU. The second storage device 130 includes, for example, a nonvolatile memory and a volatile memory. The nonvolatile memory is, for example, a ROM, an EPROM, or an EEPROM. The volatile memory is, for example, a RAM. The input device 150 is a device that receives input from the user U and outputs the input to the second processing device 100. The input device 150 is, for example, a keyboard or a touch panel.

The second communication device 160 is a device that communicates with the first communication device 280 of the projector 20. That is, the second communication device 160 includes the wireless communication module or the wired communication module explained above adapted to the communication scheme and a communication standard corresponding to the first communication device 280. The third communication device 170 is a device that communicates with a network NW (FIG. 1) including a communication network such as the Internet. A communication scheme of the third communication device 170 may be either a wireless scheme or a wired scheme. That is, the third communication device 170 includes the wireless communication module or the wired communication module explained above. When a communication scheme and a communication standard are common to the second communication device 160 and the third communication device 170, the information processing apparatus 10 only has to include one of the second communication device 160 and the third communication device 170.

As shown in FIG. 1, an NFT marketplace 4 and a blockchain network 5 are connected to the network NW in this embodiment. NFT is an abbreviation of Non-Fungible Token. The third communication device 170 communicates with the NFT marketplace 4 via the network NW. The NFT marketplace 4 and the blockchain network 5 are explained in detail below.

The second storage device 130 in this embodiment stores a program 131 for controlling the information processing apparatus 10. A processor of the second processing device 100 executes the program 131, whereby the second processing device 100 functions as an individual ID acquirer 101, an unfixed information generator 102, an irreversible converter 103, an electronic watermark generator 104, an electronic watermark discloser 105, an NFT generator 106, and an NFT discloser 107.

The individual ID acquirer 101 acquires the individual ID 221 from the projector 20 via the second communication device 160. The individual ID acquirer 101 may acquire the individual ID 221 input to the input device 150 by the user U.

The unfixed information generator 102 generates unfixed information D. The unfixed information D is information concerning an unfixed value and is, for example, information that changes every time the information is generated, information that changes every time the activity is performed in the venue A, or information that changes according to a situation at the time of generation. The situation at the time of generation is, for example, a date, time, a place, weather, or temperature. A specific form of the unfixed information D is, for example, numbers, alphabets, or signs or a character string of one or more characters of a combination of the numbers, the alphabets, and the signs. A nonce value is used as the unfixed information D in this embodiment. The nonce value is a numeric string that changes every time the numeric string is generated. That is, the unfixed information generator 102 in this embodiment generates the nonce value using a pseudorandom number generation algorism. In this embodiment, the unfixed information D only has to be different at least for each of activities performed in the venue A.

The irreversible converter 103 converts a first parameter E1 into a second parameter E2 based on a predetermined irreversible conversion algorithm. The first parameter E1 in this embodiment is data including at least the individual ID 221 and the unfixed information D. The predetermined irreversible conversion algorithm in this embodiment is a hash algorithm. That is, the second parameter E2 in this embodiment is a hash value obtained by converting the first parameter E1 according to the hash algorithm. The hash algorithm is, for example, SHA-256 (Secure Hash Algorithm 256-bit). The predetermined irreversible conversion algorithm is not limited to the hash algorithm.

The electronic watermark generator 104 generates the electronic watermark data CD based on the second parameter E2. The electronic watermark data CD is data of the electronic watermark C representing the second parameter E2. The electronic watermark C in this embodiment includes a QR code including character string information of the second parameter E2. The QR code is a registered trademark. For example, when the hash algorithm is SHA-256, the hash value of the second parameter E2 is a character string of sixty-four characters. A size of the QR code capable of storing an information amount of the second parameter E2 is 29×29 cells. The electronic watermark generator 104 in this embodiment generates the electronic watermark data CD for setting the QR code of this size as the electronic watermark C. The electronic watermark C is not limited to the QR code. The electronic watermark C may be, for example, a two-dimensional barcode of another form or a character string of the second parameter E2.

The electronic watermark discloser 105 outputs the electronic watermark data CD generated by the electronic watermark generator 104 to the projector 20 via the second communication device 160. The electronic watermark discloser 105 causes the projector 20 to display, through projection, the image B on which the electronic watermark C based on the electronic watermark data CD is superimposed. As a result, as shown in FIG. 1, in the venue A, the image B including the electronic watermark C is displayed in a position visually recognizable by the participants UA and the electronic watermark C is disclosed to be imagable by imaging devices F of the participants UA. As explained above, since the electronic watermark C includes the character string information of the second parameter E2, the electronic watermark C being disclosed is equivalent to the second parameter E2 being disclosed. Therefore, the electronic watermark discloser 105 in this embodiment has a function of, by displaying the electronic watermark C using the projector 20, disclosing the second parameter E2 to the participants UA present in the venue A to be imagable by the participants UA.

The NFT generator 106 generates an NFT 400 linked with the electronic watermark C. More specifically, the NFT generator 106 generates the NFT 400 including the first parameter E1, which is a value of an irreversible conversion source of the second parameter E2 represented by the electronic watermark C. As explained above, the first parameter E1 in this embodiment is data including at least the individual ID 221 and the unfixed information D. Therefore, the NFT 400 includes at least the individual ID 221 and the unfixed information D.

The NFT generator 106 in this embodiment generates the NFT 400 including the second parameter E2 and owner information G indicating possession of the NFT 400 in addition to the first parameter E1. Specifically, the NFT generator 106 records the first parameter E1, the second parameter E2, and the owner information G in, for example, metadata of the NFT 400. Consequently, the first parameter E1, the second parameter E2, and the owner information G are recorded in the NFT 400 in a form in which the first parameter E1, the second parameter E2, and the owner information G are linked with one another. The NFT generator 106 may include, in the NFT 400, other information such as a creation date and time, information concerning the user U, information concerning the venue A, and information concerning the activity in the venue A. The second parameter E2 included in the NFT 400 is not limited to the character string information of the second parameter E2. For example, the second parameter E2 may be the electronic watermark data CD or a URI (Uniform Resource Identifier) indicating a storage place of the character string information of the second parameter E2.

The NFT discloser 107 discloses the NFT 400 generated by the NFT generator 106 to an unspecified large number of people by registering the NFT 400 in the NFT marketplace 4 (FIG. 1) via the third communication device 170.

The NFT marketplace 4 is an Internet site accessible by the unspecified large number of people from communication terminals via the network NW and is an Internet site that provides a place for distribution such as purchase and sales of an NFT. The NFT marketplace 4 is provided by one or a plurality of server computers.

The NFT 400 is registered in the NFT marketplace 4, whereby the unspecified large number of people become capable of viewing the NFT 400 and the metadata of the NFT 400 using the communication terminals. As explained above, the metadata is the data including the first parameter E1, which is the value of the irreversible conversion source of the second parameter E2. That is, the NFT discloser 107 has a function of disclosing the first parameter E1 to the unspecified large number of people by registering the NFT 400 in the NFT marketplace 4.

The NFT 400 registered in the NFT marketplace 4 is managed by ledger data of the blockchain network 5. The blockchain network 5 is a network including a plurality of computers respectively functioning as nodes. The ledger data is distributed and managed by the nodes. The ledger data is mutually monitored by the nodes. Tampering of the ledger data is prevented by the monitoring. It is guaranteed that the ledger data is true data. Therefore, the NFT 400 is managed according to the ledger data of the blockchain network 5, whereby tampering of the NFT 400 is prevented and authenticity of the first parameter E1, the second parameter E2, and the owner information G included in the NFT 400 is guaranteed.

Figure 5:
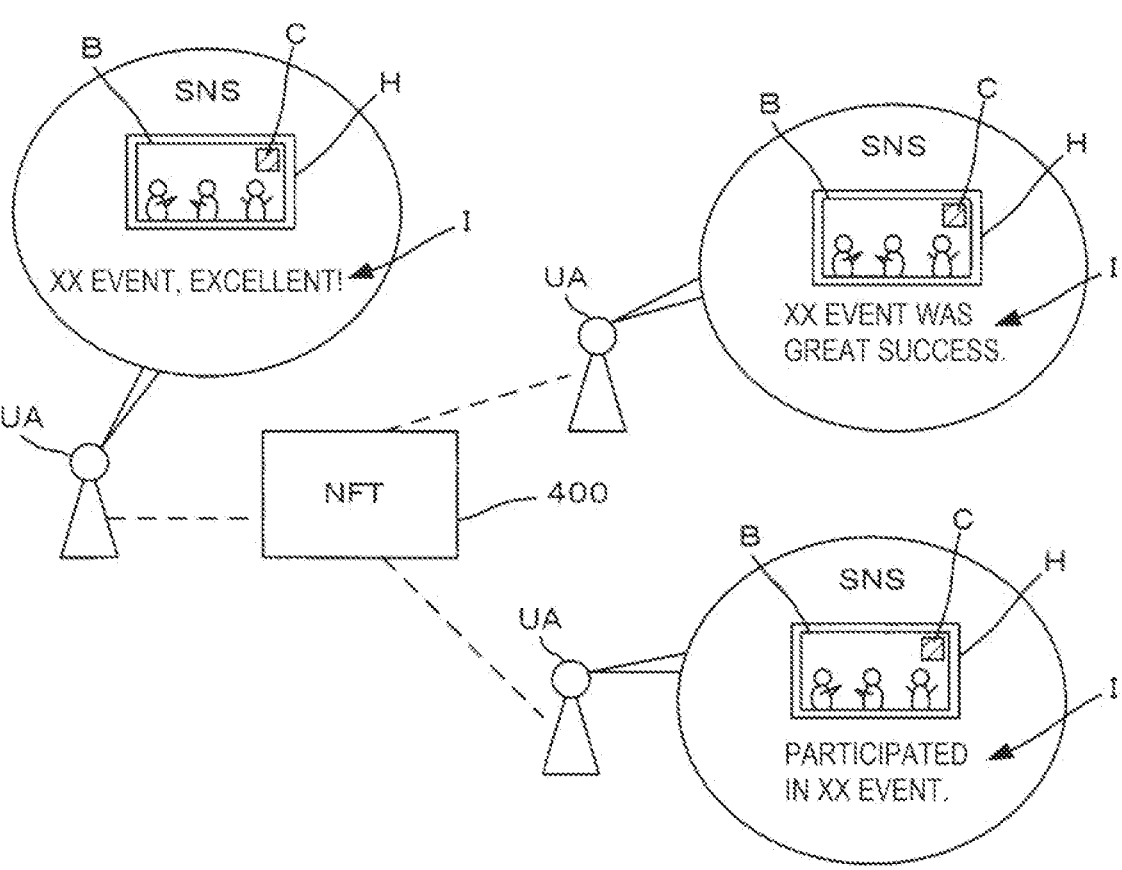
FIG. 5 is an explanatory diagram of distribution of a captured image by a participant.

In this embodiment, when the participants UA pay a fee for participation in the activity to the user U, who is the sponsor, a first right, a second right, and a third right are imparted to the participants UA from the user U. The first right is a right to privately performing still capturing of the image B with the imaging devices F of the participants UA. The second right is a right to be an owner of the NFT 400. The third right is a right to distribute, through a Web service such as an SNS (Social networking service), a captured image H (FIG. 5) of the image B and a comment I (FIG. 5) concerning the activity. All or some of the first right, the second right, and the third right may be free of charge.

In order to make it possible to impart ownership of the NFT 400 to the plurality of participants UA, the NT marketplace 4 in this embodiment provides a market in which the plurality of participants UA are capable of trading shared ownership of one NFT 400. The user U, who is the sponsor of the activity, may impart the ownership of the NFT 400 to the plurality of participants UA by using a method of dividing ownership of a token linked with the NFT 400 into a plurality of pieces of ownership and selling the ownership.

Operation of the Information Processing Apparatus

Figure 4:
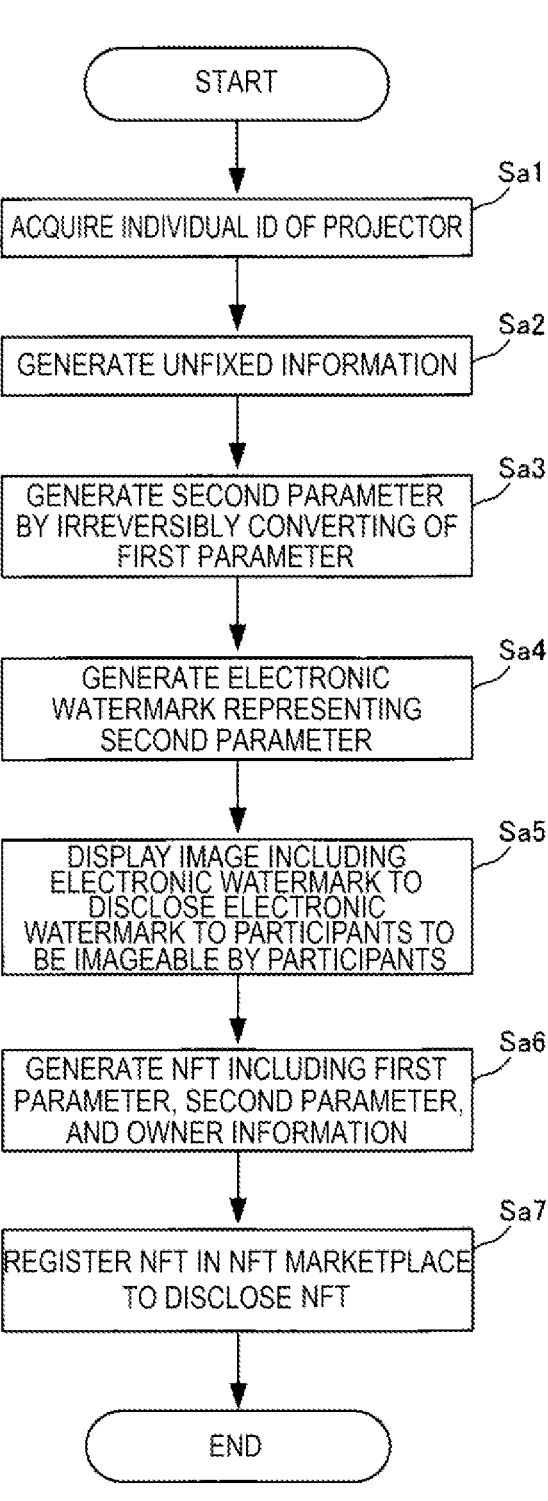
FIG. 4 is a diagram showing an operation of the information processing apparatus.

FIG. 4 is a diagram showing an operation of the information processing apparatus 10.

When holding the activity in the venue A, for example, if the user U starts the information processing apparatus 10, the individual ID acquirer 101 acquires the individual ID 221 from the projector 20 (step Sa1) and the unfixed information generator 102 generates the unfixed information D (step Sa2). Whichever of step Sa1 and step Sa2 may be performed first or step Sa1 and step Sa2 may be simultaneously performed.

Subsequently, the irreversible converter 103 generates the second parameter E2 by irreversibly converting the first parameter E1 including the individual ID 221 and the unfixed information D according to the predetermined irreversible conversion algorithm (step Sa3). As explained above, the second parameter E2 in this embodiment is a hash value of the first parameter E1.

Subsequently, the electronic watermark generator 104 generates the electronic watermark data CD of the electronic watermark C representing the second parameter E2 (step Sa4). The electronic watermark discloser 105 causes the projector 20 to display the image B including the electronic watermark C corresponding to the electronic watermark data CD (step Sa5). According to the processing in step Sa5, the electronic watermark C indicating the second parameter E2 is disclosed to the participants UA present in the venue A to be imagable by the participants UA.

Subsequently, the NFT generator 106 generates the NFT 400 including the first parameter E1 and the owner information G (step Sa6). In the owner information G, information concerning the user U, who is an issuer, is stored as information concerning a first owner. In step Sa6 in this embodiment, the NFT generator 106 includes the second parameter E2 as well in the NFT 400. Subsequently, the NFT discloser 107 registers the NFT 400 in the NFT marketplace 4 via the third communication device 170 (step Sa7). The NFT 400 is disclosed to the unspecified large number of people according to the processing in step Sa7.

The NFT 400 registered in the NFT marketplace 4 is managed by the blockchain network 5 as explained above. As a result, authenticity of the first parameter E1 and the second parameter E2 included in the NFT 400 is guaranteed by the management of the blockchain network 5.

A form in which the disclosure of the NFT 400 in step Sa7 is performed after the disclosure of the electronic watermark C in step Sa5 is shown in FIG. 4. However, the disclosure of the electronic watermark C in step Sa5 and the disclosure of the NFT 400 in step Sa7 may be simultaneously performed.

After the disclosure of the electronic watermark C indicating the second parameter E2 or simultaneously with the disclosure of the electronic watermark C, the NFT 400 indicating the first parameter E1 is disclosed to the unspecified large number of people according to the processing in step Sa7 and step Sa5. As a result, the disclosure of the first parameter E1 enables an outsider to specify the second parameter E2 disclosed simultaneously with or earlier than the first parameter E1. The association of the first parameter E1 and the second parameter E2 becomes publicly known or well known. Therefore, it is unnecessary to manage the association of the first parameter E1 and the second parameter E2 using a dedicated apparatus such as a server computer. It is possible to reduce cost for the management.

The first parameter E1 and the second parameter E2 after the disclosure are managed by the blockchain network 5 as the NFT 400. Therefore, authenticity of the first parameter E1 and the second parameter E2 is guaranteed.

Guarantee of being a True Participant UA in the Activity

In the display system 1 in this embodiment, the participant UA is guaranteed, by becoming an owner of the NFT 400 corresponding to the electronic watermark C disclosed during the activity, as being a true participant UA in the activity.

Specifically, according to the second right explained above, the ownership of the NFT 400 after issuance is imparted to the true participant UA by the user U. The NFT 400 after issuance is distributively managed by nodes of the blockchain network 5, whereby tamper resistance of the owner information G is improved. Therefore, a new owner after issuance of the NFT 400 is guaranteed, by the user U who has imparted the second right and the tamper resistance of the blockchain network 5, as being the true participant UA.

The NFT 400 is linked with, in a one-to-one relation, the electronic watermark C disclosed during the activity. Therefore, an activity in which the true participant UA owning the NFT 400 participated is guaranteed as being an activity in which the electronic watermark C corresponding to the NFT 400 was disclosed. Therefore, when the activity is, for example, a meeting or a lesson, the participant UA can also use the NFT 400 as a certificate of the participant UA participating in the meeting or the lesson. The participant UA can use, by capturing the captured image H including the image B and fellow attendees, the captured image H as evidence proving that fellow attendees attended the meeting or the lesson.

The second parameter E2 included in the NFT 400 is a value obtained by irreversibly converting the first parameter E1. Therefore, an outside cannot generate the NFT 400 including a regular second parameter E2 as long as one of the first parameter E1 and the predetermined irreversible conversion algorithm is unknown. That is, even if the outsider falsifies a pair of the electronic watermark C and the NFT 400, the falsification of the NFT 400 is always exposed by a value of the second parameter E2 of the NFT 400. Therefore, the true participant UA is more surely guaranteed by the possession of the NFT 400.

The first parameter E1 in this embodiment includes the individual ID 221 of the projector 20 installed in the venue A. Therefore, an owner and a borrower of the projector 20 to which the individual ID 221 is given can argue, using the projector 20 as evidence, that the owner and the borrower are persons having a relation with the issuer (the first owner) of the NFT 400 including the first parameter E1.

For example, it is assumed that various rights incidental to the activity are linked in advance with the owner of the NFT 400 and the owner of the NFT 400 owns the various rights. In this case, the user U, which is the sponsor of the activity, can cause the various rights to belong to any person according to designation of the owner of the NFT 400. When the user U designates the owner or the borrower of the projector 20 as the owner of the NFT 400, the owner or the borrower of the projector 20 can also argue ownership of the various rights using the projector 20 as evidence.

Distribution of the Image B of the Electronic Watermark C by the Participant UA

In this embodiment, all the participants UA participating in the activity are permitted by the first right explained above to perform still capturing of the image B with the imaging devices F of the participants UA in the venue A. Further, all the participants UA are permitted by the third right explained above to distribute the captured image H added with the comment I about the activity through a Web service such as an SNS in which the participants UA participate.

Therefore, after participating in the activity, the participant UA can freely distribute the captured image H together with, for example, the comment I describing an impression of the activity through the Web service such as the SNS. Since the captured image H and the comment I are distributed from the participant UA, the activity is widely made public and popularity of the activity is improved. On the other hand, the user U can obtain profit from circulation of the captured image H by selling the third right relating to the distribution of the captured image H obtained by capturing the image B.

By owing the NFT 400 corresponding to the electronic watermark C included in the captured image H prior to the distribution of the captured image H, the participant UA can indicate to the outsider that the participant UA is the true participant UA in the activity. On the other hand, when a distributor of the captured image H does not own the NFT 400, since it becomes clear that the distribution is performed by the outsider not participating in the activity, fraudulent distribution of the captured image H or the image B is suppressed.

Since the captured image H including the electronic watermark C is distributed through a Web service such as an SNS together with the comment I concerning the activity, it is publicly recognized that the electronic watermark C is associated with the activity indicated by the comment I. Therefore, the association of the electronic watermark C and the activity does not need to be managed by a server computer or the like.

Therefore, even if the image B including a falsified electronic watermark C is fraudulently distributed together with the comment I of the activity, the presence of the electronic watermark C and the comment I distributed by the regular participant UA makes it clear that there is a doubt of falsification in the electronic watermark C of the image B and the distribution is fraudulent. In addition, credibility of the falsified electronic watermark C is lowered as the association of the regular electronic watermark C and the activity is more widely publicly recognized by more participants UA distributing the captured image H including the electronic watermark C and the comment I. Therefore, in a popular activity in which many participants UA gather, although fraudulent distribution tends to be rampant, since the distribution of the regular electronic watermark C and the comment I is also actively performed, it is easy to distinguish genuineness of the electronic watermark C.

As explained above, the display system 1 in this embodiment includes the information processing apparatus 10. The information processing apparatus 10 executes disclosing, by displaying the image B including the electronic watermark C, the second parameter E2, which is obtained by irreversibly converting the first parameter E1, to be imagable by the participant UA and, simultaneously with disclosing the second parameter E2 or after disclosing the second parameter E2, disclosing the first parameter E1 to an unspecified large number of people through registration of the NFT 400 including the first parameter E1.

As a result, the disclosure of the first parameter E1 enables an unspecified large number of outsiders to specify the second parameter E2 disclosed simultaneously with or earlier than the first parameter E1. The association of the first parameter E1 and the second parameter E2 becomes publicly known or well known. Therefore, it is unnecessary to manage the association of the first parameter E1 and the second parameter E2 using a dedicated apparatus such as a server computer. It is possible to reduce cost for the management and operation of the display system 1.

In the display system 1 in this embodiment, the first parameter E1 disclosed by the issuance of the NFT 400 is managed by the blockchain network 5.

Therefore, authenticity of the disclosed first parameter E1 is guaranteed.

In the display system 1 in this embodiment, since the disclosure of the first parameter E1 includes the first parameter E1 and the second parameter E2, the disclosure is disclosure by the issuance of the NFT 400 in which the first parameter E1 and the second parameter E2 are linked. The NFT 400 is managed by the blockchain network 5.

Therefore, authenticity of the second parameter E2 after the disclosure is also guaranteed in addition to the first parameter E1 after the disclosure.

In the display system 1 in this embodiment, the disclosure of the second parameter E2 is, by causing the projector 20 to project the electronic watermark C equivalent to a first image indicating the second parameter E2, causing the projector 20 to display the electronic watermark C.

Therefore, the second parameter E2 is surely disclosed to a person who visually recognizes display by the projector 20. The person who has visually recognized the display can surely leave, by imaging the electronic watermark C with the imaging device F, as the captured image H, the electronic watermark C indicating the second parameter E2.

Since the display apparatus that displays the electronic watermark C is the projector 20, the image B including the electronic watermark C can be enlarged and displayed on a large screen.

Since the display apparatus is the projector 20, prior image processing for, for example, embedding the electronic watermark C in the image B is unnecessary. The image B including the electronic watermark C can be displayed by projection that superimposes the electronic watermark C on the image B. Therefore, even when the image B associated with a situation of the activity is displayed in real time, it is possible to include the electronic watermark C in the image B without hindering a real time property. Since the various rights are linked in advance with the NFT 400 corresponding to the electronic watermark C, for example, it is possible to sell a right relating to capturing of the image B displayed in real time.

In the display system 1 in this embodiment, the captured image H of the electronic watermark C is disclosed, through a Web service such as an SNS, by the person who has visually recognized the display by the projector 20.

Since the electronic watermark C is publicly recognized by the disclosure of the electronic watermark C, a server computer or the like that manages the electronic watermark C is unnecessary and it is possible to reduce cost for the management. Even if the electronic watermark C is falsified, since the regular electronic watermark C is widely disclosed, credibility of the falsified electronic watermark C is lowered and it is easy to determine genuineness of the electronic watermark C.

2. Second Embodiment

Figure 6:
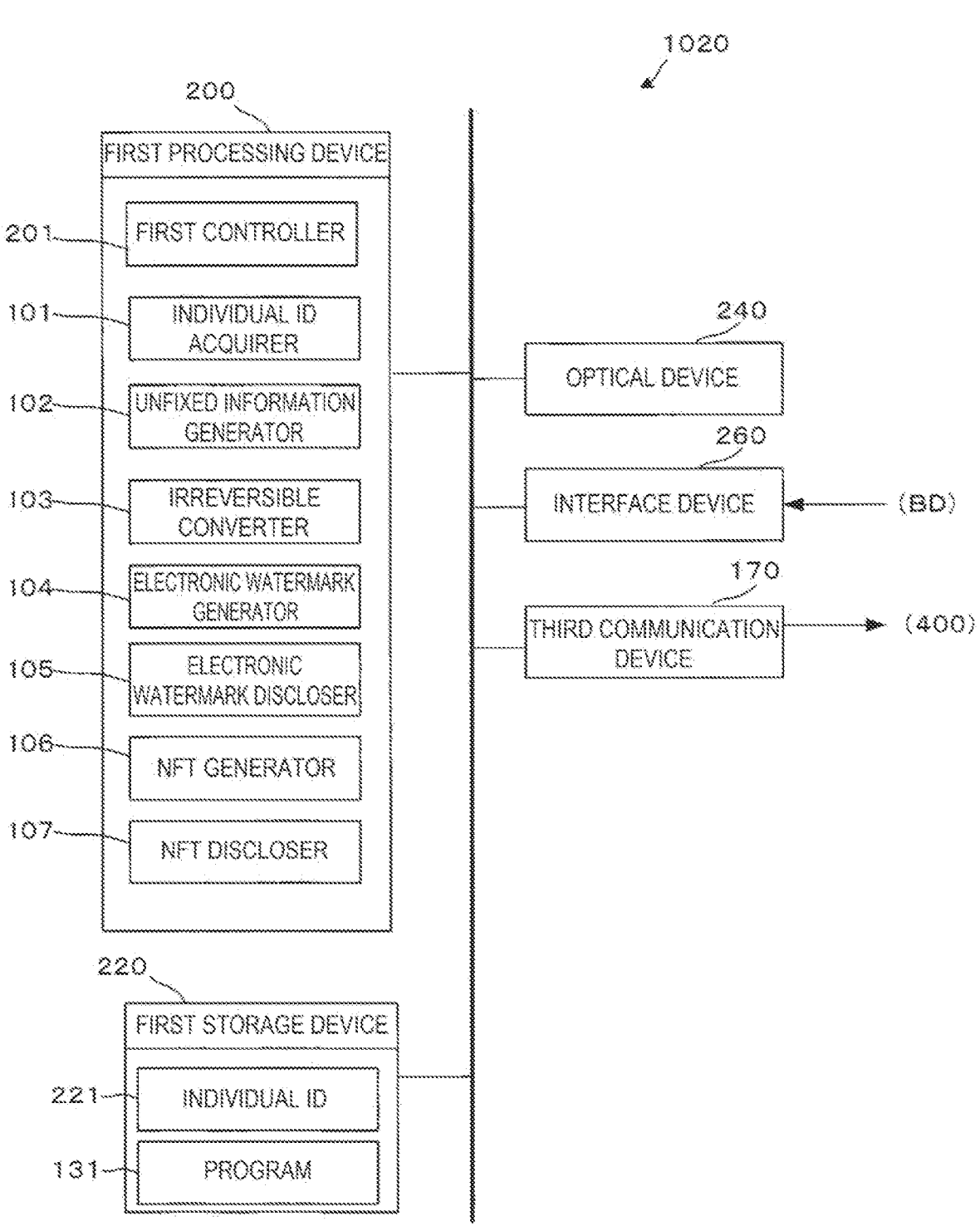
FIG. 6 is a diagram showing an example of an electric configuration of a projector according to a second embodiment of the present disclosure.

FIG. 6 is a diagram showing an example of an electric configuration of a projector 1020 according to a second embodiment of the present disclosure. In FIG. 6, the components explained in the first embodiment are denoted by the same reference numerals and signs and explanation of the components is omitted.

In place of the information processing apparatus 10 in the first embodiment, the projector 1020 in this embodiment executes disclosing the second parameter E2 obtained by irreversibly converting the first parameter E1 and disclosing the first parameter E1 after the disclosure of the second parameter E2 or simultaneously with the disclosure of the second parameter E2.

Specifically, as shown in FIG. 6, like the second processing device 100 of the information processing apparatus 10, the first processing device 200 of the projector 1020 functions as the individual ID acquirer 101, the unfixed information generator 102, the irreversible converter 103, the electronic watermark generator 104, the electronic watermark discloser 105, the NFT generator 106, and the NFT discloser 107. Like the information processing apparatus 10, the projector 1020 includes the third communication device 170 that communicates with the network NW to which the NFT marketplace 4 is connected.

With the projector 1020 in this embodiment, the information processing apparatus 10 is unnecessary. Cost of the display system 1 can be reduced.

3. Modifications

The modes illustrated above can be variously modified. Specified modes of modifications applicable to the modes explained above are illustrated below. Two or more modes optionally selected from the following illustrations can be combined with one another as appropriate in a range in which technical contradiction is not caused.

(1) The information processing apparatus 10 is not limited to one computer and may be implemented by a plurality of computers. Specifically, the functional units included in the second processing device 100 of the information processing apparatus 10 may be implemented by processors respectively included in the plurality of computers. In this case, the steps shown in FIG. 4 are allocated to the plurality of computers and executed by the computers. The computer may be the projector 20. That is, the first processing device 200 of the projector 20 may include the functional units included in the second processing device 100 of the information processing apparatus 10.

(2) The projector 20 may be another display apparatus capable of displaying the image B including the electronic watermark C. For example, the display apparatus may be an apparatus in which the optical device 240 includes a flat panel display such as a liquid crystal panel or an organic EL (electroluminescence) panel, a DMD (Digital Micromirror Device), and an LED (light-emitting diode) array.

(3) The individual ID 221 included in the first parameter E1 may be any ID set by the user U.

(4) The irreversible conversion of the first parameter E1 is not limited to the conversion performed using the hash algorithm. For example, the irreversible conversion may be nonreversible image compression conversion of a first image indicating the first parameter E1. The nonreversible image compression conversion is, for example, JPEG (Joint Photographic Experts Group).

(5) The disclosure of the first parameter E1 is not limited to the display by the display apparatus. For example, the disclosure of the first parameter may be disclosure performed using voice output from a loudspeaker device or the like.

4. Summary of the Present Disclosure

A summary of the present disclosure is noted below.

(Note 1) An information management method including a computer executing: disclosing a second parameter obtained by irreversibly converting a first parameter; and disclosing the first parameter simultaneously with disclosing the second parameter or after disclosing the second parameter.

According to Note 1, according to the disclosure of the first parameter, an outsider becomes capable of specifying the second parameter disclosed simultaneously with or earlier than the first parameter and association of the first parameter and the second parameter becomes publicly known or well known. Therefore, it is unnecessary to manage the association of the first parameter and the second parameter using a dedicated apparatus such as a server computer. It is possible to reduce cost for the management.

(Note 2) The information management method described in Note 1, wherein the disclosed first parameter is managed by a blockchain network.

According to Note 2, authenticity of the disclosed first parameter is guaranteed.

(Note 3) The information management method described in Note 2, wherein the disclosing the first parameter includes disclosing the first parameter in a form in which the first parameter and the second parameter are linked.

According to Note 3, authenticity of the second parameter after the disclosure is also guaranteed in addition to the first parameter after the disclosure.

(Note 4) The information management method described in any one of Note 1 to Note 3, wherein the disclosing the second parameter includes causing a display apparatus to display a first image indicating the second parameter.

According to Note 4, the second parameter is surely disclosed to a person who visually recognizes the display. The perform who has visually recognized the display can surely leave the second parameter as a captured image by capturing the first image with an imaging device.

(Note 5) The information management method described in Note 4, further including being disclosed a captured image obtained by capturing the first image displayed by the display apparatus.

According to Note 5, since the first image is publicly recognized by the disclosure of the first image, a server computer or the like that manages the first image is unnecessary. It is possible to reduce cost for the management. Even if the first image is falsified, since a regular first image is widely disclosed, credibility of the falsified first image is lowered and it is easy to determine genuineness.

(Note 6) A display apparatus including: an optical device; and a controller configured to control the optical device, wherein the controller executes: causing the optical device to display a second parameter obtained by irreversibly converting a first parameter; and disclosing the first parameter simultaneously with displaying the second parameter or after displaying the second parameter.

According to Note 6, the same effects as the effects in Note 1 are obtained.

(Note 7) A non-transitory computer-readable storage medium storing a program, the program causing a computer to execute: disclosing a second parameter obtained by irreversibly converting a first parameter; and disclosing the first parameter simultaneously with disclosing the second parameter or after disclosing the second parameter.

According to Note 7, the same effects as the effects in Note 1 are obtained.

What is claimed is:

1. An information management method comprising:

acquiring a first parameter from an optical device that includes identification information that identifies the optical device;

generating a second parameter by irreversibly converting the first parameter;

causing the optical device to display an image that includes a mark that represents the second parameter;

generating a token that includes the first parameter and the second parameter; and registering the token in order to disclose the first parameter and the second parameter in the token, wherein disclosure of the first parameter in the token enables an outsider to specify the second parameter using the mark that represents the second parameter.

2. The information management method according to claim 1, wherein the first parameter is managed by a blockchain network.

3. The information management method according to claim 1, wherein the token includes the first parameter, the second parameter and owner information of the token.

4. The information management method according to claim 1, wherein the token is registered in order to disclose the first parameter and the second parameter in the token to a user that captures an image of the mark displayed by the optical device.

5. The information management method according to claim 1, wherein the optical device is a device that emits image light within a projector and the optical device emits the image light in order to display the image that includes the mark that represents the second parameter.

6. A display apparatus comprising:

an optical device; and a controller programmed to execute acquiring a first parameter from the optical device that includes identification information that identifies the optical device;

generating a second parameter by irreversibly converting the first parameter;

causing the optical device to display an image that includes a mark that represents the second parameter;

generating a token that includes the first parameter and the second parameter; and registering the token in order to disclose the first parameter and the second parameter in the token, wherein disclosure of the first parameter in the token enables an outsider to specify the second parameter using the mark that represents the second parameter.

7. A non-transitory computer-readable storage medium storing a program, the program causing a computer to execute:

acquiring a first parameter from an optical device that includes identification information that identifies the optical device;

generating a second parameter by irreversibly converting the first parameter;

causing the optical device to display an image that includes a mark that represents the second parameter;

generating a token that includes the first parameter and the second parameter; and registering the token in order to disclose the first parameter and the second parameter in the token, wherein disclosure of the first parameter in the token enables an outsider to specify the second parameter using the mark that represents the second parameter.

\* \* \* \* \*